United States Patent [19]
Ivers

[11] Patent Number: 6,009,985
[45] Date of Patent: Jan. 4, 2000

[54] EFFICIENT MULTI-DIRECTIONAL ACTIVE VIBRATION ABSORBER ASSEMBLY

[75] Inventor: Douglas E. Ivers, Cary, N.C.

[73] Assignee: Lord Corporation, Cary, N.C.

[21] Appl. No.: 08/799,065

[22] Filed: Feb. 10, 1997

[51] Int. Cl.$^7$ ........................................................ F16F 7/10
[52] U.S. Cl. ............................................ 188/380; 267/136
[58] Field of Search ..................................... 188/378–380, 188/267; 267/136, 140.15, 140.16, 140.14; 248/550, 559, 636, 562, 638; 244/17.11–17.27, 54, 75 R; 381/71.1, 71.2, 71.11, 71.4, 73.1, 93, 83, 71.7; 181/206; 52/167.2, 1; 367/901; 416/500, 144; 180/300, 312, 902

[56] References Cited

U.S. PATENT DOCUMENTS

| | | | |
|---|---|---|---|
| 3,487,888 | 1/1970 | Adams et al. | 181/33 |
| 3,490,556 | 1/1970 | Bennett, Jr. et al. | 181/33 |
| 4,470,121 | 9/1984 | Ebert | 364/508 |
| 4,715,559 | 12/1987 | Fuller | 244/1 N |
| 5,052,529 | 10/1991 | Sutcliffe et al. | 188/378 |
| 5,174,552 | 12/1992 | Hodgson et al. | 267/140.11 |
| 5,231,336 | 7/1993 | van Namen | 318/128 |
| 5,310,137 | 5/1994 | Yoerkie, Jr. et al. | 244/17.27 |
| 5,526,292 | 6/1996 | Hodgson et al. | 364/574 |
| 5,551,650 | 9/1996 | Southward et al. | 244/54 |

FOREIGN PATENT DOCUMENTS

| | | |
|---|---|---|
| 0 554 057 A1 | 8/1993 | European Pat. Off. . |
| WO 96/12121 | 4/1996 | WIPO ................ F16F 7/10 |

OTHER PUBLICATIONS (Abstract) Institute of Electrical Engineers, Pratt, Oueini and Nayfeh, "A Terfenol–D Nonlinear Vibration Absorber", Smart Structures and Materials 1997: Smart Structures and Integrated Systems, vol. 3041, pp. 56–66.

*Primary Examiner*—Douglas C. Butler
*Attorney, Agent, or Firm*—Randall S. Wayland; Wayne W. Rupert

[57] ABSTRACT

An Active Vibration Absorber assembly (20) including a casing (24), a first tuning mass (32) supported relative to the casing (24) which is actively vibratable by a force generator (40) in a first direction (along an A—A axis), a second tuning mass (32') supported relative to said casing (24) which is actively vibratable by a force generator (40') in a second direction (along axis B—B) generally orthogonal to the first direction, and a flexible member (26) flexibly supporting the casing (24). In a first embodiment, the tuning masses (32, 32') are vibratable by a magnet and coil assembly within shakers (25, 25') and the flexible member (26) is a beam. In other embodiments, multiple beams are employed to restrict the vibration of casing (24) to substantially planar motion. The AVA assembly (20) finds application in Active Structural Control (ASC) systems for actively canceling vibration or noise in vehicle cabins (example: automobiles, aircraft).

14 Claims, 4 Drawing Sheets

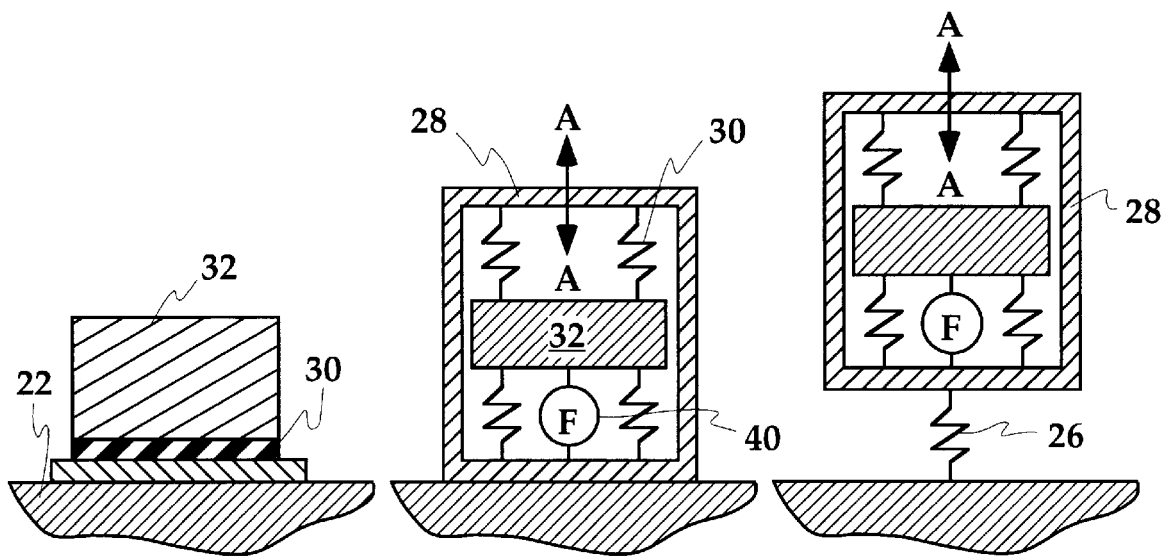
Fig. 1
Prior art
Fig. 2
Prior art
Fig. 3
Prior art
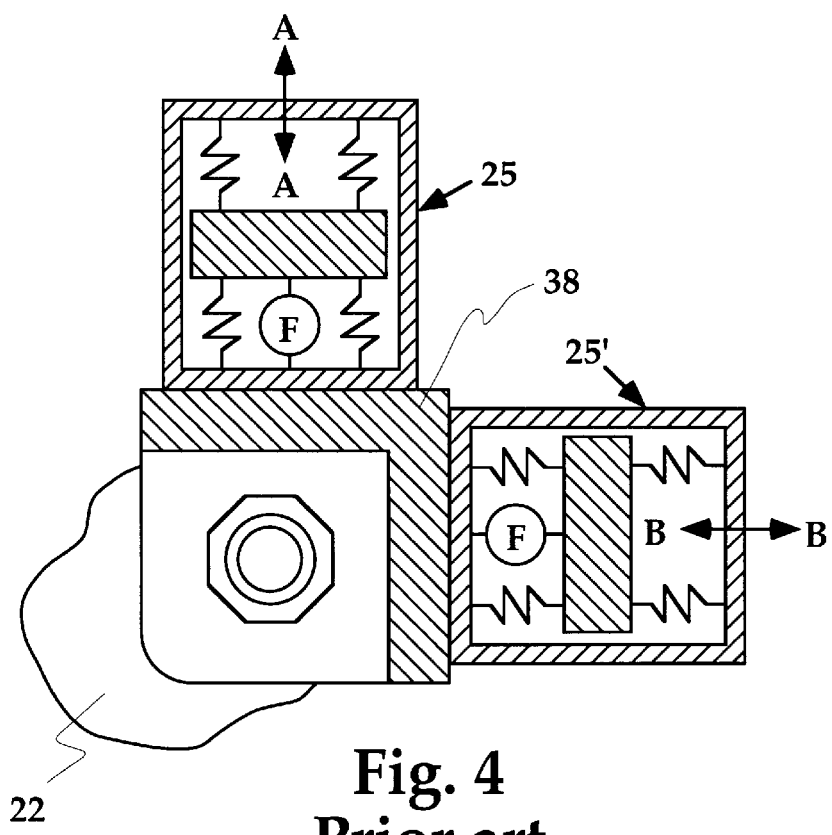
Fig. 4
Prior art

EFFICIENT MULTI-DIRECTIONAL ACTIVE VIBRATION ABSORBER ASSEMBLY

FIELD OF THE INVENTION

This invention relates to the area of devices and systems for controlling acoustic noise and/or vibration. Specifically, it relates to actively-controlled devices for controlling noise and/or vibration via Active Structural Control (ASC) methods.

BACKGROUND OF THE INVENTION

Within the prior art, various means have been developed to counter noise and/or vibration problems. These include passive treatments, passive Tuned Vibration Absorbers (TVAs), Adaptive TVAs (ATVAs), Active Noise Control (ANC), Active Structural Control (ASC), and Active Isolation Control (AIC) all of which will be briefly described herein. Passive treatments, such as sound-deadening blankets, are generally effective in attenuating higher-frequency noise, but are generally ineffective at attenuating low-frequency noise, for example, low-frequency engine tones. Notably, passive blankets must be relatively massive to reduce low-frequency noise transmission into a vehicle's cabin. Therefore, other mechanisms are generally employed for low-frequency vibration/noise suppression.

Passive Tuned Vibrations Absorbers (TVA's) are known devices which find utility in absorbing low-frequency vibration to provide local vibration reduction at their attachment point. TVAs may also be effective at cancelling low-frequency noise within a vehicle's cabin which is radiating from the surrounding structure. Although, TVAs are generally well adapted for attenuating low-frequency noise, they are generally somewhat limited in range and effectiveness. As shown in Prior Art FIG. 1, passive TVAs include a suspended tuning mass 32 which is tuned (along with a stiffness of spring 30), such that the device exhibits a resonant natural frequency (fn) which generally cancels or absorbs vibration of the vibrating structure 22 at the point of attachment thereto. The afore-mentioned disadvantage of passive TVAs is that they are only effective at a particular frequency (fn) or within a very narrow frequency range thereabouts. Therefore, TVAs may be ineffective if the disturbance frequency is changed, such that the TVA is not excited at its resonant frequency (fn). Moreover, passive TVAs may be unable to generate proper magnitude or phasing of forces needed for effective vibration suppression and/or control. In aircraft, passive TVAs may be attached to the interior stiffening rings or stringers of the fuselage or to the yoke. U.S. Pat. No. 3,490,556 to Bennett, Jr. et al. entitled: "Aircraft Noise Reduction System With Tuned Vibration Absorbers" describes a passive vibration dampening device for attachment on the yoke of an aircraft for absorbing vibration at the N1 and N2 rotational frequencies.

When a wider range of vibration cancellation is required, various adaptive TVAs may be employed. For example, U.S. Pat. No. 3,487,888 to Adams et al. entitled "Cabin Engine Sound Suppresser" teaches an adaptive TVA where the resonant frequency (fn) can be adaptively adjusted by changing the "length" of a beam, or the rigidity of a resilient cushioning material. Although, the range of vibration attenuation may be increased with adaptive TVAs, they still may be somewhat ineffective for certain applications, in that their range of adjustment may not be large enough, or they may not be able to generate large enough dynamic forces to dramatically reduce acoustic noise or vibration experienced within a vehicle's cabin, albeit, under certain circumstances they may be quite effective.

In some applications where a higher level of noise and/or vibration attenuation is desired, Active Isolation Control (AIC) systems may be used for controlling noise/vibration within the vehicle. AIC systems include "active mountings" which are attached between the engine (disturbance source) and its attachment structure (frame, pylon, etc.). Active mountings include an actively driven element therein, which provides the active control forces for isolating vibration and preventing its transmission from the engine into the vehicle's structure. The resultant effect is a reduction of annoying interior acoustic noise, as well as a reduction in vibration, in most cases. Known AIC systems include the feedforward type, in which reference signals from reference sensors are used to provide a signal indicative of the engine vibration(s) to the control process. Likewise, error sensors provide error signals indicative of the residual noise/vibration. These reference and error signals are processed by the digital controller to generate output signals of the appropriate phase and magnitude (anti-vibration) to drive an output active mounting to reduce vibration transmission from the engine to the structure, and resultantly control the interior acoustic noise and structural vibration.

U.S. Pat. No. 5,551,650 entitled "Active Mounts For Aircraft Engines" describes one such AIC system. Furthermore, commonly assigned U.S. Pat. No. 5,174,552 to Hodgson et al. entitled "Fluid Mount With Active Vibration Control" describes one type of active fluid mounting. Notably, it should be understood, that in some applications there may be insufficient space envelope to house the active elements within the active mounting. Further, there may be alternate vibration paths into the structure, or the appropriate actuation directions required for good vibration attenuation may be difficult to achieve within the space constraints of the active mount. Therefore, under these circumstances, other types of active control may be implemented, such as Active Noise Control (ANC) or Active Structural Control (ASC).

Active Noise Control (ANC) systems are also well known. ANC systems include a plurality of acoustic output transducers, such as loudspeakers, strategically located within the vehicle's cabin/passenger compartment. These loudspeakers are driven responsive to input signals from input sensors representative of the disturbance and error signals from error sensors disbursed within the vehicle's cabin. Input signals may be derived from engine tachometers, accelerometers, or the like. The output signals to the loudspeakers are generally adaptively controlled via a digital controller according to a known feedforward-type adaptive control algorithms, such as the Filtered-x Least Mean Square (LMS) algorithm, or the like. Copending U.S. patent application Ser. No. 08/553,227 to Billoud entitled "Active Noise Control System For Closed Spaces Such As Aircraft Cabins" describes one such ANC system. Further discussions of ANC systems may be found in U.S. Pat. No. 5,526,292 to Hodgson et al. entitled "Broadband Noise And Vibration Reduction." ANC systems have the disadvantage that they do not address any mechanical vibration problem that may exist, and may be difficult to retrofit in certain vehicles. Furthermore, as the frequency of the noise increases, larger numbers of error sensors and speakers are required to achieve sufficient global noise attenuation.

Certain ASC systems utilizing AVAs, known in the prior art, may solve this problem of needing a large number of error sensors by attacking the vibrational modes of the vehicle's structure directly. For example, by attaching a vibrating device, such as an inertial shakers or AVAs to the interior surface of the fuselage, as described in U.S. Pat. No. 4,715,559 to Fuller, global attenuation can be achieved with a minimal number of error sensors. However, the modifications necessary to retrofit AVAs in this manner may be prohibitive, as the interior trim may have to be removed and structural modifications made have to be made to the stringers or stiffening-ring frames. Furthermore, for control of higher order tones, a large number of AVAs may be needed, thereby requiring large power requirements for each AVA and associated amplifier. Therefore, prior art ASC systems are necessarily difficult to retrofit and may require the use of many inertial shakers to effectuate control of higher-order tones. U.S. Pat. No. 5,310,137 to Yoerkie, Jr. et al. describes the use of AVAs to cancel high-frequency vibrations of a helicopter transmission. Notably, Yoerkie, Jr. et al. is a feedback-type system.

As described in Prior Art FIG. 2, Active Vibration Absorbers (AVAs) comprise a tuning mass 32, a housing 28, a spring 30 flexibly supporting the tuning mass 32, and a force actuator 40 (coil and magnet assembly or the like) for actively driving the tuning mass 32 along its acting axis A—A. The stiffness of spring 30 and mass of tuning mass 32 may be tuned such that the AVA is more easily driven at its predominant frequency. Prior Art FIG. 3 describes a Multiple-Degree-of-Freedom Active Vibration Absorber (MDOF AVA). MDOF AVAs include an extra flexible member 26. The mass of housing 28 and stiffness of additional flexible member 26 are tuned to provide a second resonant frequency. Further descriptions of AVAs and MDOF AVAs can be found in Copending U.S. application Ser. No. 08/322,123 entitled "Active Tuned Vibration Absorber", copending PCT application PCT/US95/13610 (WO 96/12121) entitled "Active Systems and Devices Including Active Vibration Absorbers (AVAs)", U.S. Ser. No. 08/698,544 entitled "Active Noise and Vibration Control System", U.S. Ser. No. 08/693,742 entitled "Active Structural Control System and Method Including Active Vibration Absorbers (AVAs), and U.S. Ser. No. 08/730,773 entitled "Hybrid Active-Passive Noise and Vibration Control System for Aircraft." FIG. 4 illustrates one prior art preferred implementation for achieving active forces in multiple directions. The AVAs (which could also be MDOF AVAs) are attached to rigid bracket 38 which attaches to structure 22 via fastener shown. The inertial shakers/AVAs 25, 25' shown are actively driven along their acting axes at the appropriate frequency, amplitude, and phase to appropriately control noise and/or vibration.

The individual AVAs described above suffer from the problems that they are either mass inefficient, incapable of multiple direction actuation, or require large amounts of electrical power. Therefore, there is a long felt and recognized need for an AVA assembly which provides multi-directional active vibrational forces to effectively control vibration within the structure, which is efficient, and which minimizes mass and power requirements for generating the needed cancellation forces.

SUMMARY OF THE INVENTION

Therefore, in light of the advantages and drawbacks of the prior art, the present invention is an Active Vibration Absorber (AVA) assembly of the type useful for control of noise and/or vibration caused by a source of vibration. The AVA assembly comprises a casing, a first tuning mass flexibly supported by the casing which is actively vibratable in a first direction, a second tuning mass flexibly supported by the casing which is actively vibratable in a second direction substantially orthogonal to the first direction, and a flexible member flexibly supporting the casing.

It is an advantage of the present invention AVA assembly that it can be easily retrofitted, in the field, without extensive modifications to the structure.

It is an advantage of the present invention AVA assembly that it can control vibration over a wider frequency range, thereby controlling unwanted and annoying acoustic noises within the vehicles cabin over a wider frequency range.

It is an advantage of the present invention AVA assembly that it can control vibration in multiple directions.

It is an advantage of the present invention AVA assembly that it can generate large dynamic forces with a less massive device.

It is an advantage of the present invention AVA assembly that it is efficient, thus reducing size and power requirements.

It is an advantage of the present invention AVA assembly that it can control multiple vibrational frequencies.

The abovementioned and further features, advantages, and characteristics of the present invention will become apparent from the accompanying descriptions of the preferred and other embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings, FIG. 1 is a cross-sectional side view of a prior art Tuned Vibration Absorber (TVA), FIG. 2 is a cross-sectional side view of a prior art Active Vibration Absorber (AVA), FIG. 3 is a cross-sectional side view of a prior art Multi-Degree-of-Freedom Active Vibration Absorber (MDOF AVA), FIG. 4 is a cross-sectional side view of a prior art AVA installation.

DETAILED DESCRIPTION OF THE INVENTION

Figure 5:
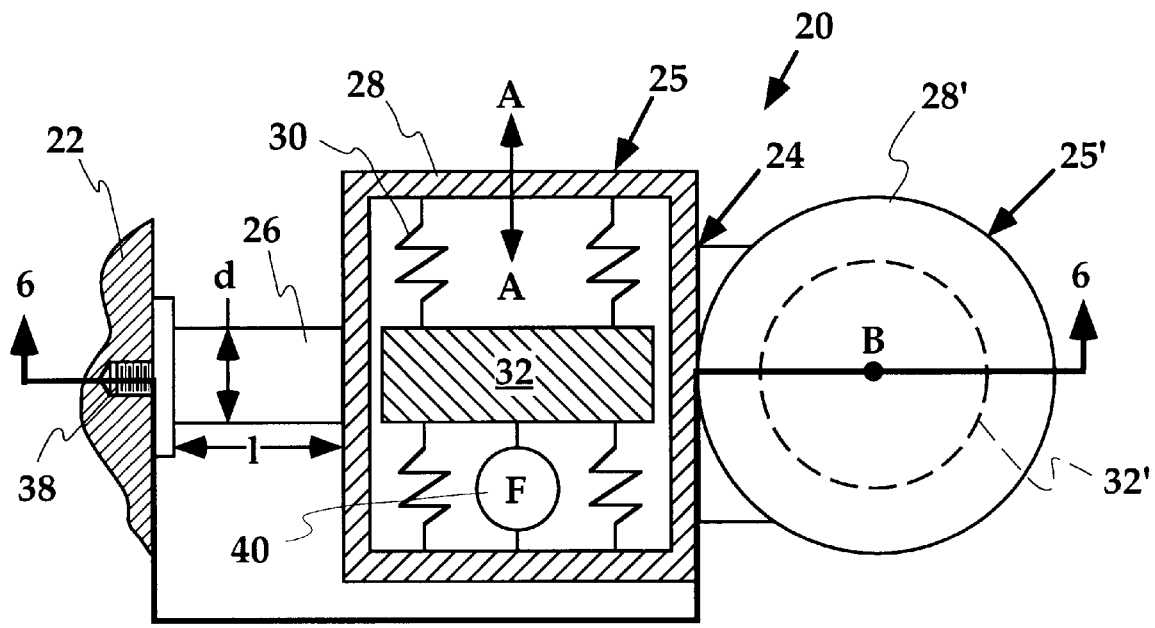
FIGS. 5 and 6 are partial cross-sectional side and bottom views, respectively, of the present invention multi-directional AVA assembly.
Figure 6:
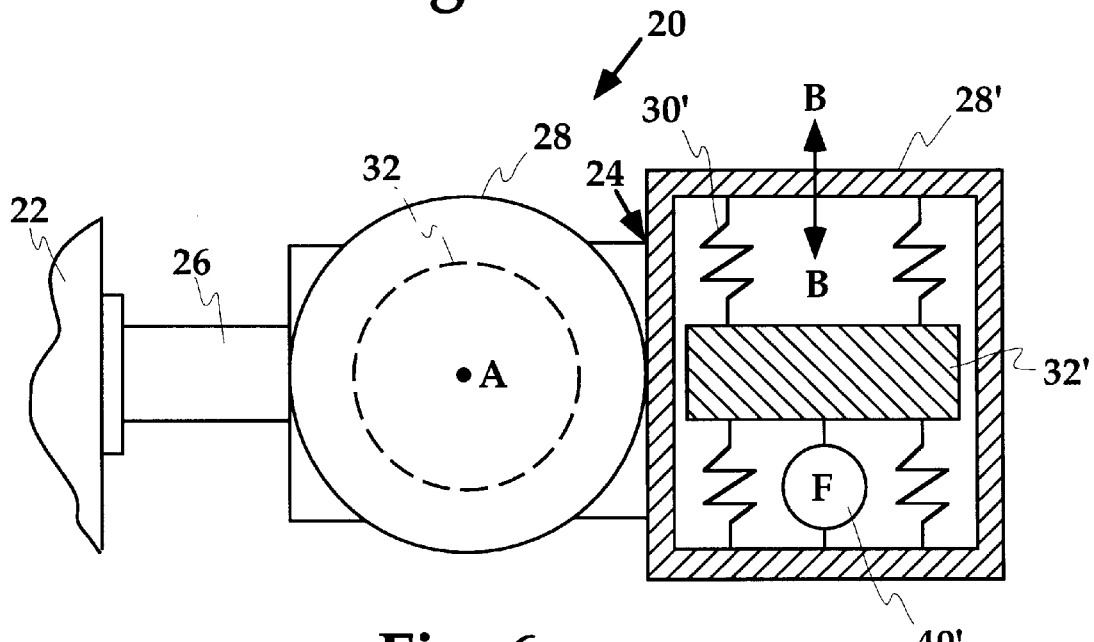

Referring now to the Drawings where like numerals denote like elements, in FIGS. 5 and 6, shown generally at 20, is a first embodiment of the present invention AVA. This invention has particular applicability for controlling vibration and noise in aft-fuselage-mounted turbofan aircraft, such as the DC-9 aircraft. The AVA 20 is comprised of a casing 24 flexibly supporting a first tuning mass 32 which is oriented such that it is actively vibrated by active force actuator 40 in a first direction (along axis A—A) and a second tuning mass 32' operatively and actively vibrated along a second direction (along axis B—B) which is substantially orthogonal to said first direction, and at least one flexible member 26 flexibly supporting the casing 24. The AVA 20 attaches to the structure 22 (e: a frame, pylon, etc.) by way of a fastener or the like, but preferably screws into the structure via a single fastener 38. The flexible member 26 shown is preferably a metal cantilever beam, whereby the stiffness thereof is tuned by adjusting the length 1, diameter d, and modulus of the material used. Other embodiments will be described herein wherein the flexible member 26 comprises multiple flexible beams or flexible elastomer sections.

In this embodiment, the casing 24 is comprised of housings 28, 28' of inertial actuators 25, 25'. Each inertial actuator 25, 25' comprises a tuning mass 32, 32', and at least one, and preferably a plurality of springs 30, 30' supporting the tuning masses 32, 32' relative to the housings 28, 28', and active force generators 40, 40' for actively driving the tuning masses 32, 32' at the appropriate frequency, amplitude, and phase to accomplish the control task, i.e., controlling vibration or noise. It should be understood that the stiffnesses of springs 30, 30', flexible member 26, 26', the mass of tuning mass 32, 32', and the masses of casing 24 would be chosen such that the appropriate resonant frequencies f1 and f2 are achieved. By way of example, f1 might be tuned to be at about 120 hz while f2 might be tuned at about 186 hz.

Figure 7:
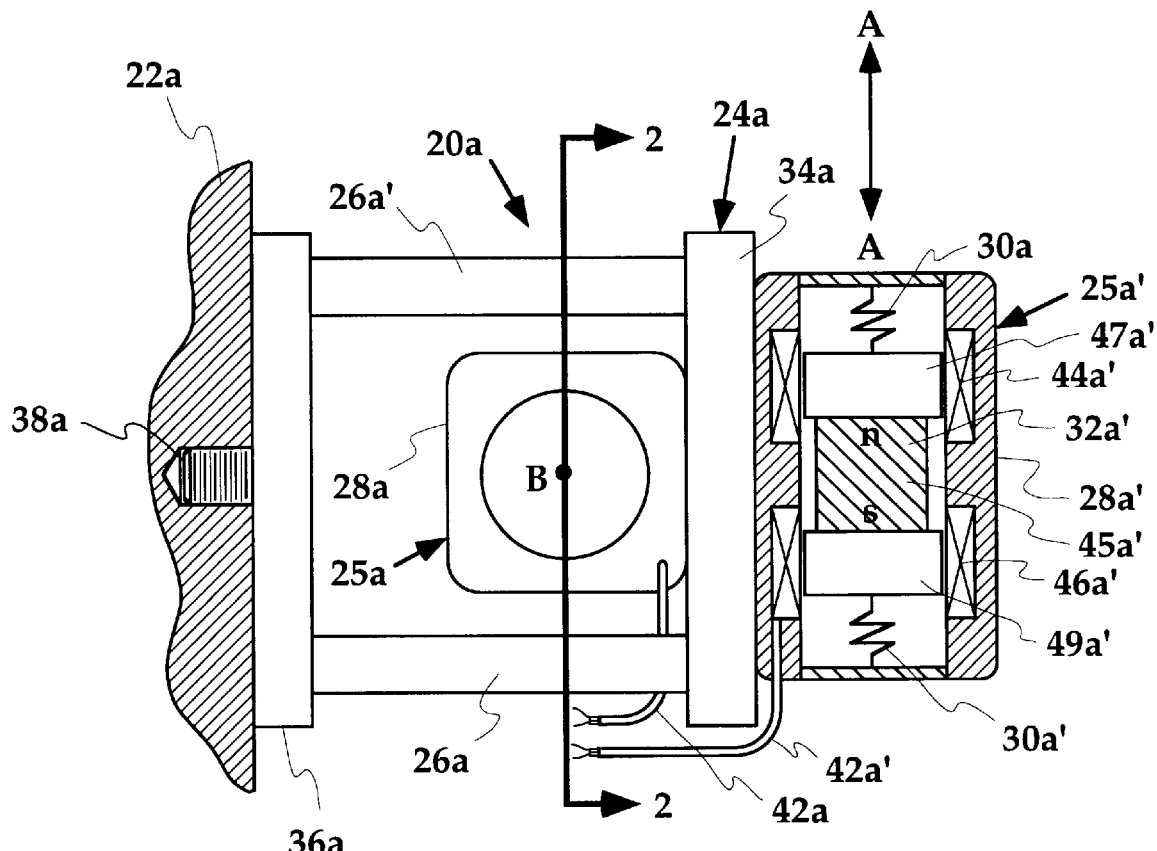
FIGS. 7 and 8 are partial cross-sectional side and end views, respectively, of another embodiment of the multi-directional AVA assembly.
Figure 8:
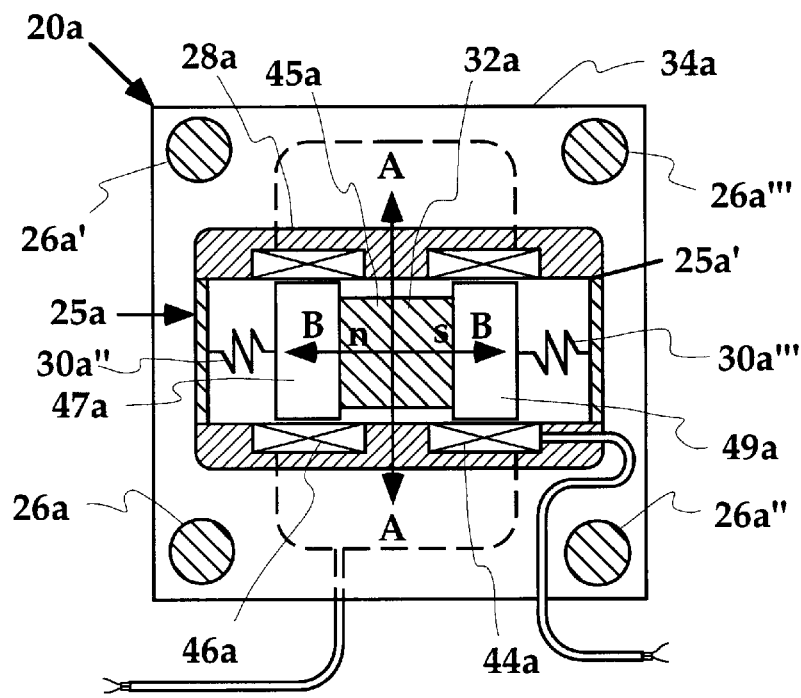

FIGS. 7 and 8 illustrate an embodiment of AVA assembly 20a that was reduced to practice and tested experimentally. This AVA assembly 20a comprises first and second inertial shakers 25a, 25a' which are securely attached to an intermediate plate 34a. The respective axes (A—A, B—B) of the shakers 25a, 25a' are arranged substantially orthogonally. The intermediate plate 34a is then flexibly supported relative to a base plate 36a which attaches to structure 22a, preferably via a single threaded fastener 38a. The means for flexibly supporting the intermediate plate 34a relative to the base plate 36a preferably comprises a plurality of flexible beam members 26a, 26a', 26a'', 26a'''. Preferably, there are four beams spaced at the corners, although more than four may be used as well. By utilizing multiple beam-type flexible members 26a, 26a', 26a'', 26a''', the movement of the intermediate member 34a in the frequencies of interest can be restricted to generally planar movement, in a plane generally parallel to the plane of the base plate 36a.

Each of the inertial shakers 25a, 25a' comprises a housing 28a, 28a' which is secured to intermediate plate 34a via brackets, bolts, or the like. The shakers 25a, 25a' include inertial tuning masses 32a, 32a' supported by at least one spring, and preferably two springs 30a, 30a', 30a'', 30a'''. The masses of tuning masses 32a, 32a' and spring stiffnesses of springs 30a, 30a', 30a'', 30a''' are chosen in conjunction with the stiffness of flexible member 26a–26a''' and mass of casing 24a to arrive at the appropriate resonant frequencies f1 and f2. The means for constraining the interior tuning masses 32a, 32a' to move only axially comprises stiff radial flexures, bearings, or the like, which are very stiff radially and sufficiently soft axially to provide the appropriate motion and axial frequency tuning. A more detailed description of this type of actuator used as an inertial shaker may be found in U.S. Pat. No. 5,231,336 to van Namen entitled "Actuator for Active Vibration Control."

It should be understood that by appropriate actuation of tuning masses 32a, 32a' via electrically energizing leads 42a, 42a', thereby energizing first and second coils 44a, 44a', 46a, 46a' that forces may be generated along the respective A—A and B—B axes. Appropriate phasing of these forces can produce forces along axis A—A, along axis B—B or along any other axis in the same plane as axes A—A and B—B. By way of example and not by limitation, the primary mass (casing 24a) is approximately 5 kg and the primary stiffness of flexible members 26a, 26a', 26a'', 26a''' combined is approximately 25,000 lb./in. (4,375,000 N/m). Likewise, the tuning masses 32a, 32a' are preferably approximately 1 Kg each and the combined stifffiesses of the springs 30a acting on masses 32a, 32a' are approximately 5,000 lb./in. (875,000 N/m). Therefore, the predominant resonant frequencies are about f1=120 hz and f2=186 hz. Each of the masses 32a, 32a' of inertial shakers comprise permanent magnets 45a, 45a' and pole pieces 47a, 47a', 49a, 49a' for directing the magnetic flux.

Figure 9:
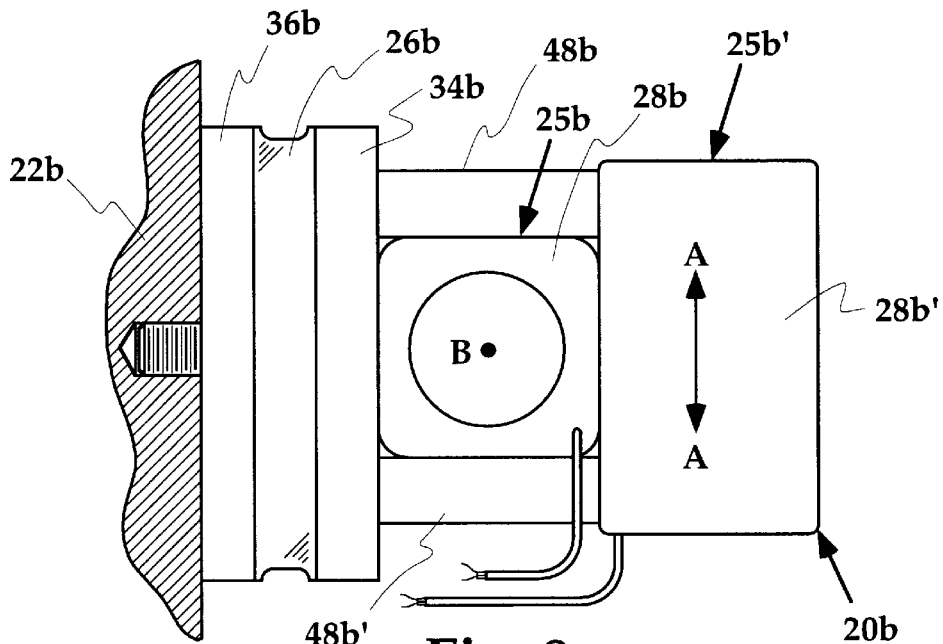
FIG. 9 is a partial cross-sectional side view of another embodiment of a multi-directional AVA assembly.

FIG. 9 illustrates another embodiment of AVA assembly 20b which comprises a first inertial shaker 25b having an first housing 28b and a first predominant axis of vibration B—B (the axis is into and out of the paper), a second inertial shaker 25b' having a second housing 28b' rigidly secured relative to said first housing 28b and exhibiting a second predominant axis of vibration (A—A) which is oriented substantially orthogonally relative to said first predominant axis (B—B), and a flexible member 26b flexibly suspending said first and second housings 28b, 28b'. Preferably, the shakers 25b, 25b' are secured to intermediate plate 34b. Further, attached between intermediate plate 34b and second shaker 25b may be optional supports 48, 48b'. In this embodiment, the flexible member 26b is a planar elastomer section which is bonded between the base plate 36b and the intermediate plate 34b. The base plate 36b preferably includes a single threaded member for securing into structure 22b. The shakers 25b, 25b' may include coil and magnet assemblies for driving the tuning masses therein. Alternatively, piezoelectric or magnetostrictive actuators may be implemented to drive the tuning masses.

Figure 10:
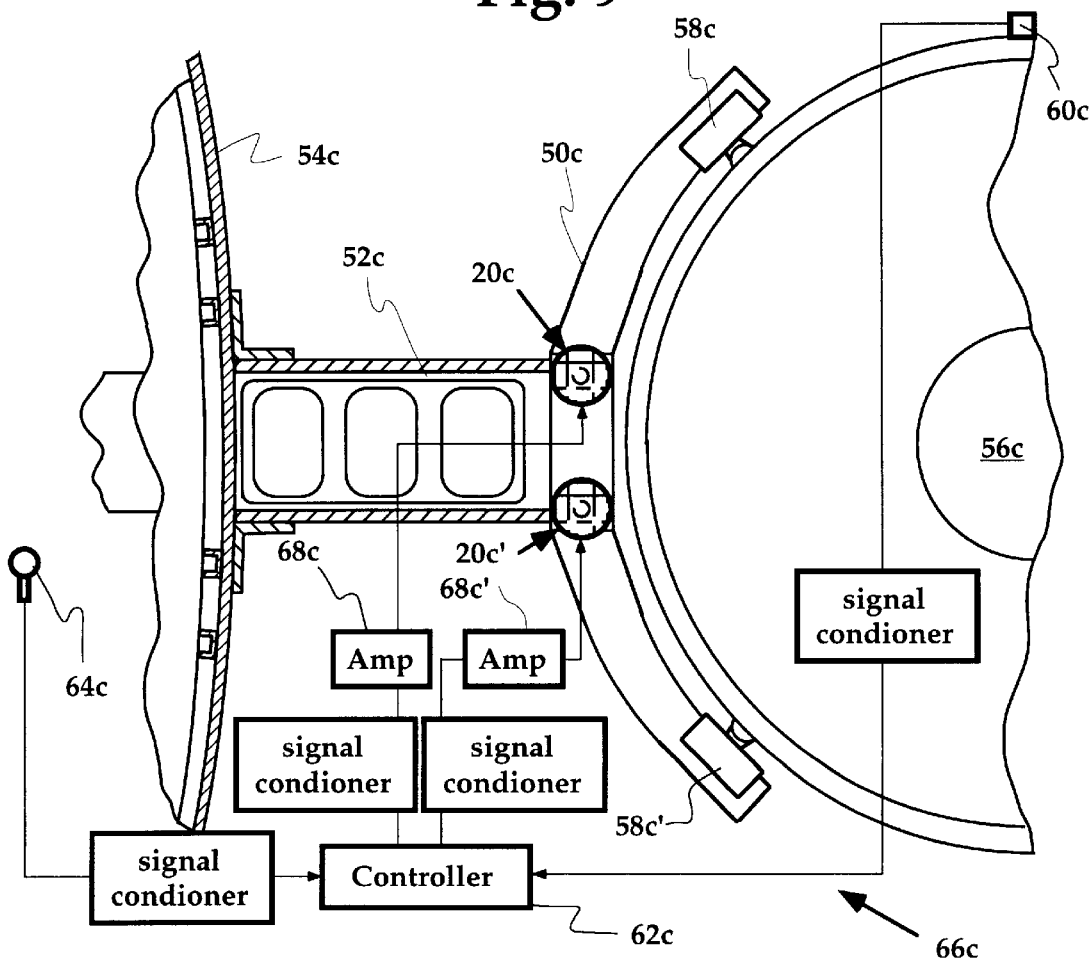
FIG. 10 is a partial cross-sectional side view of several multi-directional AVA assemblies installed in an Active Structural Control (ASC) system.

FIG. 10 illustrates several AVA assemblies 20c, 20c' included within the environment of an Active Structural Control (ASC) system 66c. Shown is an engine 56c attached to a yoke assembly 50c by engine mounts 58c, 58c'. The yoke assembly 50c attaches to pylon structure 52c which then interconnects to the fuselage 54c of the aircraft. The AVA assemblies 20c, 20c' attach at the base portion of the yoke assembly 50c where the yoke assembly 50c attaches to the pylon 52c. A reference signal is provided to the preferably digital controller 62c by the reference sensor 60c. The reference sensor 60c may be an accelerometer, tachometer, or the like and provides a signal representative of the disturbance (frequency, phase and/or amplitude). Error sensors 64c strategically located in the cabin supply error signals to the controller 62c indicative of the residual noise level in the aircraft's cabin.

The controller 62c processes the reference signal and the error signals and provides drive signals to the AVA assemblies 20c, 20c' to actively drive the tuned masses (32a, 32a' of FIGS. 7, 8) and casing 24a (FIGS. 7, 8) therein. Control algorithms such as Filtered-x LMS, or the like, may be used to control the assemblies 20c, 20c'. Because the inertial shakers within the assemblies are substantially smaller than the AVAs shown in prior art FIG. 4, the mass of the system is less and the amplifiers 68, 68c' may be made smaller. Therefore, the power requirements to drive the AVA assemblies 20c, 20c' are also reduced.

In summary, it should be apparent from the foregoing that the present invention comprises an AVA assembly including a first inertial shaker having a first housing and a first predominant axis of vibration, a second inertial shaker having a second housing rigidly secured relative to the first housing and a second predominant axis of vibration which is oriented orthogonally relative to the first predominant axis, and a flexible member suspending the first and second housings.

While several embodiments including the preferred embodiment of the present invention have been described in detail, various modifications, alterations, changes, and adaptations to the aforementioned may be made without departing from the spirit and scope of the present invention defined in the appended claims. It is intended that all such modifications, alterations, and changes be considered part of the present invention.

I claim:

1. An active vibration absorber assembly for use with a base, said active vibration absorber comprising:
   (a) a casing providing a primary tuning mass, said casing including a first housing and a second housing,
   (b) a first tuning mass flexibly supported relative to said first housing,
   (c) a first active force generator which is actively vibratable to vibrate said first tuning mass in a first direction,
   (d) a second tuning mass flexibly supported relative to said second housing,
   (e) a second active force generator which is actively vibratable to vibrate said second tuning mass in a second direction which is generally orthogonal to said first direction, and
   (f) a flexible member adapted to flexibly suspend said casing from the base such that vibration of said casing is constrained substantially solely by said flexible member,
   (g) wherein said first and second housings are rigidly connected.

2. An active vibration absorber assembly of claim 1 wherein said flexible member comprises at least one flexible beam.

3. An active vibration absorber assembly of claim 2 wherein said at least one flexible beam comprises a plurality of flexible beams.

4. An active vibration absorber assembly of claim 3 wherein said plurality of flexible beams comprises four or more flexible beams.

5. An active vibration absorber assembly of claim 3 wherein said plurality of flexible beams are spaced apart, such that the vibration of said casing comprises substantially planar motion.

6. An active vibration absorber assembly of claim 1 wherein said flexible member comprises an elastomer section.

7. An active vibration absorber assembly of claim 6 wherein said elastomer further comprises a planar elastomer section.

8. An active vibration absorber assembly of claim 1 wherein said assembly is included within an active structural control system, further comprising:
   a) a reference sensor for providing a reference signal representative of a disturbance,
   b) an error sensor for providing an error signal representative of residual, and
   c) a controller for processing said reference signal and said error signal and providing drive signals to drive said first and second tuning masses within said active vibration absorber assembly.

9. An active vibration absorber assembly of claim 8 wherein said active vibration absorber assembly is adapted to be included within a vehicle.

10. An active vibration absorber assembly of claim 8 wherein said active vibration absorber assembly is adapted to be included within an aircraft.

11. An active vibration absorber assembly of claim 8 wherein said active vibration absorber assembly is adapted to be attached to a yoke assembly of an aircraft.

12. An active vibration absorber assembly of claim 1 wherein at least one of said first tuning mass and said second tuning mass is actively driven by one selected from a group consisting of: a coil and magnet assembly, a magnetostrictive actuator, and a piezoelectric actuator.

13. An active vibration absorber assembly for use with a base, said active vibration absorber comprising:
   (a) a casing providing a primary tuning mass, said casing including a first housing and a second housing,
   (b) a first magnet tuning mass flexibly supported relative to said first housing by a first spring member said first magnet tuning mass being actively vibratable relative to said casing in a first direction by energizing at least one coil located adjacent to said first magnet tuning mass,
   (c) a second magnet tuning mass flexibly supported relative to said second housing by a second spring member, said second magnet tuning mass being actively vibratable relative to said casing in a second direction substantially orthogonal to said first direction by energizing at least one coil located adjacent to said second magnet tuning mass, and
   (d) a flexible member adapted to flexibly suspend said casing from the base such that vibration of said casing is constrained substantially solely by said flexible member,
   (e) wherein said first and second housings are rigidly connected.

14. An active vibration absorber assembly for use with a base, said active vibration absorber comprising:
   (a) a first inertial shaker having a first housing and a first vibratable tuning mass having a first predominant axis of vibration,
   (b) a second inertial shaker having a second housing rigidly secured relative to said first housing and a second vibratable tuning mass having a second predominant axis of vibration which is oriented orthogonally relative to said first predominant axis, and
   (c) a flexible member adapted to flexibly suspend said first and second housings from the base such that vibration of said casing constrained substantially solely by said flexible member.

* * * * *